(12) United States Patent
Jauquet et al.

(10) Patent No.: US 8,429,264 B2
(45) Date of Patent: Apr. 23, 2013

(54) METHOD, SYSTEM AND APPARATUS FOR MANAGING COMPUTER PROCESSES

(75) Inventors: Paul Jauquet, Annapolis, MD (US);
David Sawyer, Ashburn, VA (US);
David Jedrlinic, Dunn Loring, VA (US)

(73) Assignee: JumpSoft, Inc., Vienna, VA (US)

(*) Notice: Subject to any disclaimer, the term of this patent is extended or adjusted under 35 U.S.C. 154(b) by 0 days.

(21) Appl. No.: 13/416,498

(22) Filed: Mar. 9, 2012

(65) Prior Publication Data

US 2012/0166641 A1   Jun. 28, 2012

Related U.S. Application Data

(63) Continuation of application No. 12/485,095, filed on Jun. 16, 2009, now Pat. No. 8,156,212.

(51) Int. Cl.
*G06F 15/173* (2006.01)
(52) U.S. Cl.
USPC ............................. 709/223; 709/217; 709/224
(58) Field of Classification Search .................. 709/223, 709/224, 203, 217, 219
See application file for complete search history.

(56) References Cited

U.S. PATENT DOCUMENTS

| | | | |
|---|---|---|---|
| 5,790,829 A | 8/1998 | Flynn | |
| 6,763,454 B2 * | 7/2004 | Wilson et al. | 713/1 |
| 7,089,561 B2 * | 8/2006 | Morrison et al. | 719/312 |
| 7,155,429 B2 * | 12/2006 | Madduri et al. | 1/1 |
| 7,263,689 B1 * | 8/2007 | Edwards et al. | 717/127 |
| 7,349,945 B1 | 3/2008 | Whipple | |
| 7,733,774 B1 | 6/2010 | Sasidharan et al. | |
| 7,734,689 B2 | 6/2010 | Richer et al. | |
| 2002/0016809 A1 | 2/2002 | Foulger et al. | |
| 2003/0139918 A1 * | 7/2003 | Hardwick et al. | 703/22 |
| 2004/0107278 A1 | 6/2004 | Emaru et al. | |
| 2004/0205258 A1 * | 10/2004 | Wilson et al. | 710/1 |
| 2006/0143034 A1 | 6/2006 | Rothermel et al. | |
| 2009/0094541 A1 | 4/2009 | Foulger et al. | |

* cited by examiner

*Primary Examiner* — Lashonda Jacobs
(74) *Attorney, Agent, or Firm* — Maier & Maier, PLLC

(57) ABSTRACT

Methods, systems and apparatuses for managing computer processes in a computing environment may be described. An exemplary method may include the defining of a plurality of computer processes; the defining of a sequence that dictates the starting and stopping of the plurality of computer processes; the Defining of any process dependencies for the plurality of computer processes; the defining of a first networked environment where the plurality of computer processes run; the determining of an action to take following a system event; and the executing of the action.

9 Claims, 4 Drawing Sheets

METHOD, SYSTEM AND APPARATUS FOR MANAGING COMPUTER PROCESSES

RELATED APPLICATIONS

This application is a continuation of U.S. patent application Ser. No. 12/485,095, filed Jun. 16, 2009 and entitled METHOD, SYSTEM AND APPARATUS FOR MANAGING COMPUTER PROCESSES, the entire contents of which are hereby incorporated by reference.

BACKGROUND

Software applications can include a number of processes that may run in a distributed architecture. Methods of managing software applications, however, are often disjointed and require administrators to carry out a number of tasks, such as running commands or scripts, on a number of devices, often in a coordinated sequence. Additionally, the manual management of processes can be cumbersome and time or cost prohibitive, requiring an individual or team to monitor, coordinate and maintain the applications on a near constant basis. As a result, and due to a variety of factors, there are often situations involving system unavailability and errors can be made.

One known environment uses a monitoring system for notification and relies on a combination of operation documentation, specialized scripts for specific remediation steps and a variety of trained personnel for application management. However, this approach often takes a significant amount of time to set up and requires near-constant monitoring while also being prone to errors.

Still other known environments utilize clustered solutions to automate failover of a specific component of an application, for example a database. These environments typically support a specific process across two or more closely coupled servers, but they do not include advanced business rules for managing the multitude of processes that comprise the totality of an application. Additionally, these solutions are often overly complex and cost prohibitive, in addition to being limited to one operating system at a single physical location.

Another problem commonly faced in computing environments is disaster recovery. Disaster recovery, or the recovery of data and systems following a complete failure or extended outage, typically is expensive to set up and may need a number of technicians to implement and support various complex elements. For example, operation support often involves a combination of standard monitoring systems and detailed failover and test plans. The failover steps themselves are often manual or leverage basic automation for specific functions. However, performing failover or, alternatively, failback, can be time consuming and may introduce risk as it is challenging to perform routine tests.

SUMMARY

Methods, systems and apparatuses for managing computer processes in a computing environment may be described. An exemplary method may include the defining of a plurality of computer processes; the defining of a sequence that dictates the starting and stopping of the plurality of computer processes; the Defining of any process dependencies for the plurality of computer processes; the defining of a first networked environment where the plurality of computer processes run; the determining of an action to take following a system event; and the executing of the action.

An exemplary system for managing computing processes can have a networked computing environment; at least a first computer process server hosting at least one computer process; a management appliance communicatively coupled to the networked computing environment; and the at least first computer process server and controlling the running of the at least one computer process on the at least first computer process server.

An exemplary system for managing a computing environment may also include means for hosting any number of computer processes; means for networking any number of computer processes hosted on any number of computers; and means for managing the computer processes.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Figure 1:
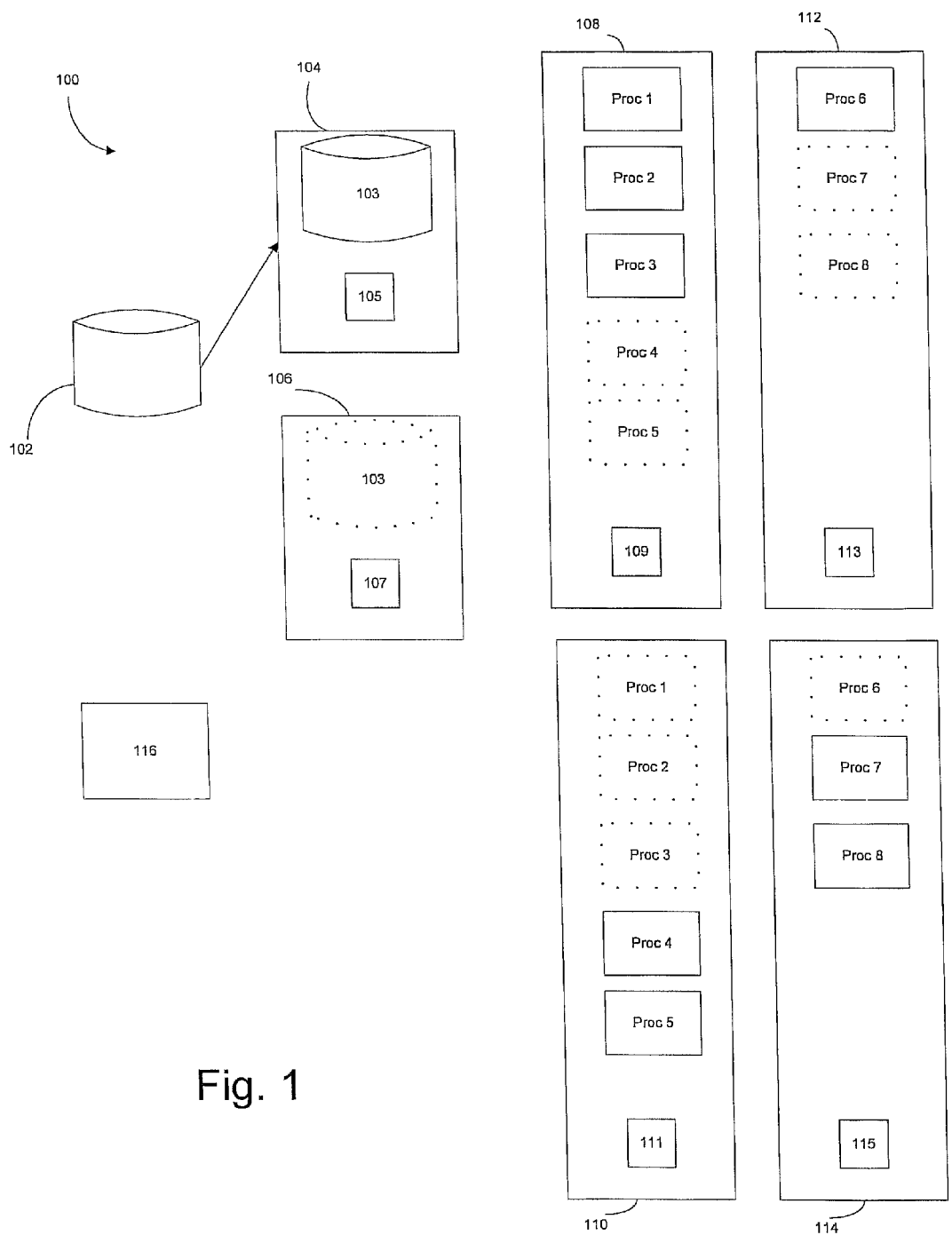
FIG. 1 is an exemplary view of a computing environment and a managing appliance.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention," "alternative embodiment(s)," and "exemplary embodiment(s)" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Additionally, some exemplary embodiments include network adapters that may also be coupled to the system to enable the data processing system to become coupled to other data processing systems or remote printers or storage devices through intervening private or public networks. Modems, cable modems and Ethernet cards are just a few of the currently available types of network adapters.

Also, exemplary embodiments may include or incorporate a database which may store software, descriptive data, system data, digital images and any other data item required by the other components necessary to effectuate any embodiment of the present system and method known to one having ordinary skill in the art. Any database may be provided, for example, as a database management system (DBMS), a relational database management system (e.g., DB2, ACCESS, etc.), an object-oriented database management system (ODBMS), a file system or another conventional database package as a few non-limiting examples. The databases can be accessed via a Structure Query Language (SQL) or other tools known to one having skill in the art.

Exemplary embodiments of methods and systems for managing computer processes may be described herein. Some exemplary embodiments may include configuration and management of processes, procedures, files, networks and other components for computing applications spread amongst distributed heterogeneous environments. Still further exemplary embodiments may include provisioning and managing application processes across a computer network, for example including accounting for dependencies that are local or in other network locations and which may occur remotely and automatically, for example, when utilizing a configurable set of rules or guidelines. In some further examples, an execution of a step in a process may be configured to be dependent on the completion of an earlier or previously executed or perform step or instruction. The process may further be generic insofar as it may be able to support any type of computer application that may run on any type of computer, any type of operating system or any type of computing environment. Any or all of these processes, steps and applications, as well as any set or grouping thereof, may be managed through the use of an appliance that may be remotely located on any type of machine and may be implemented in any of a variety of manners, as discussed herein.

Referring now to FIG. 1, an exemplary environment for managing computer processes may be shown. The method and system may include any number of applications, which can be a grouping of processes and data to perform a desired function, such as a business function, or any related configurations. Further, any number of implementations may be utilized. An implementation may be a specific instantiation of an application and which may be unique or custom or which may be copied or derived from a template, as described further below. The method and system may include environment 100. Environment 100 can include any number of computing devices that may be used to run processes for an implementation at a site. Environments, such as environment 100, can include a primary environment and any number of alternative environments, for example a disaster recovery environment. Environment 100 may be seen as a primary environment in this example.

As mentioned above, environment 100 may include any number and combination of computing devices, such as storage area network 102, multiple servers 104, 106, 108, 110, 112 and 114 and appliance 116. Further, storage area network 102 may include any type of database and database management system. Similarly, servers 104 and 106 may also include any type of database and database management system, for example the same type that is used with storage area network 102. Additionally, appliance 116 may also include any type of database and database management system and, depending on the situation, may or may not be the same type of database management system as that utilized by storage area network 102. Additionally, storage area network 102 and appliance 116 may utilize different database management systems. For example, in one embodiment storage area network may use an Oracle database management system while appliance 116 may use a MySQL database management system. This environment is only a representative, non-limiting example, however, and different environment layouts, orientations and equipment are envisioned.

Servers 104, 106, 108, 110, 112 and 114, along with any other desired servers or other computing devices, may include any functionality, such as the ability to run software or processes. For example, servers 104 and 106 may include any database management system (DBMS), for example DBMS 103. DBMS 103 may be configured on both servers 104 and 106, and any other desired server, depending on the configuration or implementation of environment 100. Also, regardless of where DBMS 103 is configured, DBMS 103 may provide similar functionality and may be configured to run a shared database, for example via a SAN, such as storage area network 102, or any other type of data replication or sharing capability, and may also be run or based off of different software or platforms. For example, server 108 may run RedHat Linux, server 110 may run SUSE Linux and servers 112 and 114 may run Windows NT. These operating systems are only exemplary, however, and any server may run any desired operating system or other software, and combination of servers may run any combination of operating systems or other software.

Additionally, each server 108, 110, 112 and 114, as well as any number of other servers or computers that may be associated with environment 100, may run any number of any processes on any number of hosts. In the exemplary embodiment shown in FIG. 1, server 108 may run five processes, for example with process 1 being C++, process 2 being Perl, process 3 being Java, process 4 being C++ and process 5 being Java. Thus, any type of process, for example, but not limited to those recited before, as well as any other type of computer processes, configurations, for example ACL, or procedures, for example DNS, may be run on any appropriate server and may be managed by appliance 116. Servers 110, 112 and 114 may run a similar set of processes, however each server may run any number of processes and any type of processes, such as C++, Java, Perl, .NET and Apache, as well as any other desired type of process, as shown in exemplary FIG. 1. Additionally, one or more of the servers may be running and any number, for example zero or more, of the processes may be running on a server, such as a primary server. However, any process may be run on any server, depending on a system event or user request, for example. In exemplary FIG. 1, server 104 may be running DBMS 103 while any process running on server 106 may be down, as indicated by the dotted lines of DBMS 103 on server 106. Similarly, server 108 may be running processes 1-3, while processes 4-5 may be down (as indicated by the dotted lines surrounding them); server 110 may be running processes 4-5, while processes 1-3 may be down (as indicated by the dotted lines surrounding them), server 112 may be running process 6, while processes 7-8 may be down (as indicated by the dotted lines surrounding them); and server 114 may be running processes 7-8, while process 6 may be down (as indicated by the dotted lines surrounding it). As discussed in more detail below, however, any process may be run on any server as requested by a user, as desired as a result of a system event, user action or as otherwise managed through appliance 116.

Appliance 116 may also be known as an application manager appliance and may include any of a variety of components and have a variety of functionality. Appliance 116, in some examples, may include software, one or more databases and one or more processes. Additionally, appliance 116 may be housed on a dedicated server or may be housed on any shared server, such as, but not limited to, a highly available server, or a remote server, for example to support software as a service or as a separate network. In still further examples, appliance 116 can include a data repository. The data repository may act to store consolidated configuration data, log data and any other type of data for one or many environments. The data repository may be a database management system or any other mechanism or component that is capable of storing, maintaining and retrieving data.

Appliance 116 may also include an application management (AM) agent. The AM agent may be a central controller for the appliance 116 insofar as it may manage any implementation or implementations. In some exemplary embodiments, the AM agent may read the configuration of each implementation and may coordinate actions with another agent, such as a cross-platform management agent (CM Agent), based on system events, user requests or any other criteria. CM agents may be sets of cross-platform processes, scripts and/or procedures for local processing and may take direction from a central AM agent. Thus, in the exemplary embodiment shown in FIG. 1, server 104, server 106, server 108, server 110, server 112 and server 114 may each include CM agents, for example CM agents 105, 107, 109, 111, 113 and 115, respectively. Additionally, appliance 116 can have a user interface. The user interface may be any type of interface, such as, but not limited to, a website, a command line and the like. Through the user interface, users can maintain a desired configuration, request an action, check the status of any desired environment and/or generate reports on any desired function or aspect of the method or system, as described in more detail below. Additionally, the interface may allow a user of appliance 116 to see a holistic view of the status of any implementations or locations of any processes being run in environment 100. Further, with respect to FIG. 1 and all exemplary embodiments described herein, environment 100 may include any desired amount of computing devices and processes which may be managed by appliance 116. For example, some environments may only have a single server and an appliance which may be connected to the server through any of a variety of manners.

Appliance 116 may be set up for an implementation of an application in any of a variety of manners. One methodology, as shown in exemplary FIG. 2, can include any of a variety of steps to set up and implement. For example, in step 202, appliance 116 may be installed in any location, for example on a server, as described previously. Next, in step 204, CM agents may be installed and started on any or all servers in the implementation that may be managed by appliance 116. Then, in step 206, one or more implementations may be generated or an existing template or templates for an implementation or implementations may be copied or modified. Also, in step 206 and as further shown below and with respect to FIG. 5, any processes and dependencies, as well as any computing devices and related properties, associated with the implementation and use of appliance 116 may be further defined. Then, in step 208, various test scenarios may be run or executed so as to verify a desired operation of the appliance. Additionally, tests conducted in step 208 may include any of a variety of manners for monitoring, defining and managing any of the processes or components discussed herein. Further, at any time during a test scenario or following the completion of a test scenario, step 206 may be repeated, allowing for the testing of any number of implementations.

In further exemplary embodiments, appliance 116, along with any interface or controls associated therewith, may be used to facilitate any desired activities in a computing environment, such as environment 100 in FIG. 1. For example, appliance 116 may be used to conduct maintenance activities such as, but not limited to, hardware replacement, operating system and/or application upgrades, and the management of network outages. Thus, appliance 116 may be used for any operation where processes may need to be started, stopped or moved in a scheduled or coordinated manner and may be capable of performing any tasks through the use of operating system commands, system calls, scripts, network calls and the like.

Additionally, appliance 116 may be used to provide any type of visibility into a status of one or more applications and may process a location or locations for implementations and/or environments. For example, a user of appliance 116 may be able to see a high level status of any applications or implementations. Any high level status may then be broken down into any desired and available detail of any aspect or process.

Referring back to FIG. 1, an exemplary implementation of a method and system for managing computer processes may be shown as a multi-tiered, highly available distributed heterogeneous environment. In this example server 104 and server 106 may be connected to storage area network (SAN) 102. The connection of server 104 and server 106 to storage area network 102 may allow for database availability if a designated primary server (e.g. server 104) were to cease properly functioning. Server 108, server 110, server 112 and server 114 may each host different processes that may all be run on server 108, server 110, server 112 or server 114. As described previously, some servers may host substantially similar processes and appliance 116 may allow for the designation of different servers to run different processes.

Still referring to FIG. 1, and in one exemplary operation of the method and system, three processes, for example process 1, process 2 and process 3, may be running on server 108 and two processes, for example process 4 and process 5, may be running on server 110, which may allow for the maximization of system resources. However, in other exemplary embodiments, the distribution of processes running on server 108 and server 110 may be any desired distribution and may include the running on processes on yet another server. Additionally, in some exemplary embodiments, server 108 and server 110 may run on different versions of operating systems, for example RedHat 4 and RedHat 5, or different operating systems, for example RedHat Linux on server 108 and SUSE Linux on server 110, or any other type or combination of operating systems. Thus, appliance 116 is able to control any desired number of processes running across two or more separate or unique platforms or operating systems. For example, server 112 and server 114 may each house any further desired processes, for example processes 6-8, and each may run on separate operating systems, such as Windows NT or any other available operating system.

An exemplary sample environment, such as that shown in FIG. 1, can include a variety of configuration rules that may govern the actions of appliance 116. As shown in exemplary Table 1 below, an exemplary process starting and stopping sequence may be used to provide protocol for starting and stopping processes. Any of a variety of factors may contribute to the starting and stopping of processes, however.

TABLE 1

| Start Sequence | | Stop Sequence | |
|---|---|---|---|
| DBMS | 103 | Proc | 8 |
| Proc | 1 | Proc | 6 |
| Proc | 2 | Proc | 7 |
| Proc | 3 | Proc | 3 |
| Proc | 4 | Proc | 5 |
| Proc | 5 | Proc | 4 |
| Proc | 6 | Proc | 2 |
| Proc | 7 | Proc | 1 |
| Proc | 8 | DBMS | 103 |

Exemplary Table 2 shows sample process dependencies or a process hierarchy. That is, in some exemplary embodiments, if the parent process is not active, then the dependent process may also not be active.

TABLE 2

| Parent Process | Dependent processes |
|---|---|
| DBMS 103 | Proc 1, Proc 2, Proc 3, Proc 4, Proc 7 |
| Proc 1 | Proc 2, Proc 7 |
| Proc 2 | Proc 3, Proc 4 |
| Proc 4 | Proc 6, Proc 7 |
| Proc 6 | Proc 7 |

Further, the exemplary parent and dependent processes shown in Table 2 below may be configured or customized in any of a variety of manners. For example, a dependent process may be configured or customized to stop when a parent process stops, to stop when a parent process crashes, to start when a parent process starts, to run on the same server as a parent process, to run on a different server than a parent process, to require a parent process to be running in order to run and/or to restart when a parent process restarts. Additionally, any configurations and customizations could be generated or managed at a parent level or at a dependent process level so as to allow for granularity for any scenario.

Exemplary Table 3 shows a sample listing of primary site server priorities. In some exemplary embodiments, a process may have a primary server to which it is associated. However, as a potential manner of providing continuity of service, data or information, each process may have a secondary, tertiary, etc. server to which each is associated. Thus, if a primary or secondary server should go down or otherwise cease to function properly, the process may continue to run or otherwise remain active on another server. Additionally, processes may be configured to run more than once on a given server or simultaneously on more than one server. Further, any process may be known to more than one implementation, for example, so that more than one group of processes can share the same database. Also, although the location of a database, process or any other implementation in environment 100 may change from a primary to a secondary (or tertiary, etc.) location, the content or effect of the database, process or any other implementation may be substantially the same as it was on the primary location.

TABLE 3

| Process | Primary, Secondary, Tertiary, etc |
|---|---|
| DBMS 103 | Server 104, Server 106 |
| Proc 1 | Server 108, Server 110 |

TABLE 3-continued

| Process | Primary, Secondary, Tertiary, etc |
|---|---|
| Proc 2 | Server 108, Server 110 |
| Proc 3 | Server 108, Server 110 |
| Proc 4 | Server 110, Server 108 |
| Proc 5 | Server 110, Server 108 |
| Proc 6 | Server 112, Server 114 |
| Proc 7 | Server 114, Server 112 |
| Proc 8 | Server 114, Server 112 |

Taking into account the exemplary values and conditions set forth in Tables 1-3, a variety of exemplary scenarios may be utilized to demonstrate a method and system for managing computer processes so that all desired processes may continue to run following the occurrence of a system event. For example, in a first exemplary scenario, a system event occurs whereby process 2 stops. The appliance can determine that the system event has happened and may interpret this information. In looking at the exemplary tables above, process 2 is the parent process of process 3 and process 4. Additionally, process 4 is the parent process of process 6 and process 7. Further, process 6 is the parent process of process 7. Therefore, if process 2 stops, process 6 and process 7 will stop, as well as process 3 and process 4. Then, to have all of the affected processes begin running properly again, process 2 is started on server 3, if process 2 fails to start it could then be started on server 4, process 3 and process 4 may be restarted, as well as process 6 and process 7. Following these exemplary steps after a system event where process 2 stops can result in all processing running in normal configuration.

In another exemplary scenario, and in building on the above scenario, a user may request, for example using a user interface or command line or any other available manner, to move the database management system from a first server (e.g. server 104) to a second server (e.g. server 106). In reviewing Tables 1-3 after such a user request, process 6, process 7, process 3, process 4, process 2, process 1 and DBMS 103 would all be stopped as each process is dependent on DBMS 103 on server 104. Then DBMS 103 could be started on the second server, server 106, effectively moving DBMS 103 from the server 104 to server 106. Next, process 1, process 2, process 3, process 4, process 6 and process 7 could be started and would again be running on the primary server to which they are associated (according to exemplary Table 3) or where they had been previously running (if configured to do so).

In yet a further exemplary scenario that builds on the previous scenario, a server may crash and become unavailable, for example server 110. Here, it can be seen that server 110 is the primary server for process 4 and process 5. Therefore, process 4 will have stopped running and may need to stop any dependent processes (whereas process 5 does not have any dependent processes in this example). Then, it may further be seen that process 4 is the parent process to process 6 and process 7; thus, process 6 and process 7 may need to be stopped. Then, in order to enable all of the processes to return to their running status and exclude server 110, process 4 and process 5 may be restarted on their secondary server, which is shown as server 108 in this example scenario. Then, as discussed previously, process 6 and process 7 will need to be started as they are dependent on process 4. However, because process 6 and process 7 run on server 112 and server 114, respectively, they may be started on their primary servers as their primary servers were not affected by the crashing of server 110. Thus, as a result of these steps, the DBMS 103 may remain running on server 106, processes 1-5 may remain running on server 108, process 6 may remain running on server 112 and process 7 and 8 may remain running on server 114.

Figure 3:
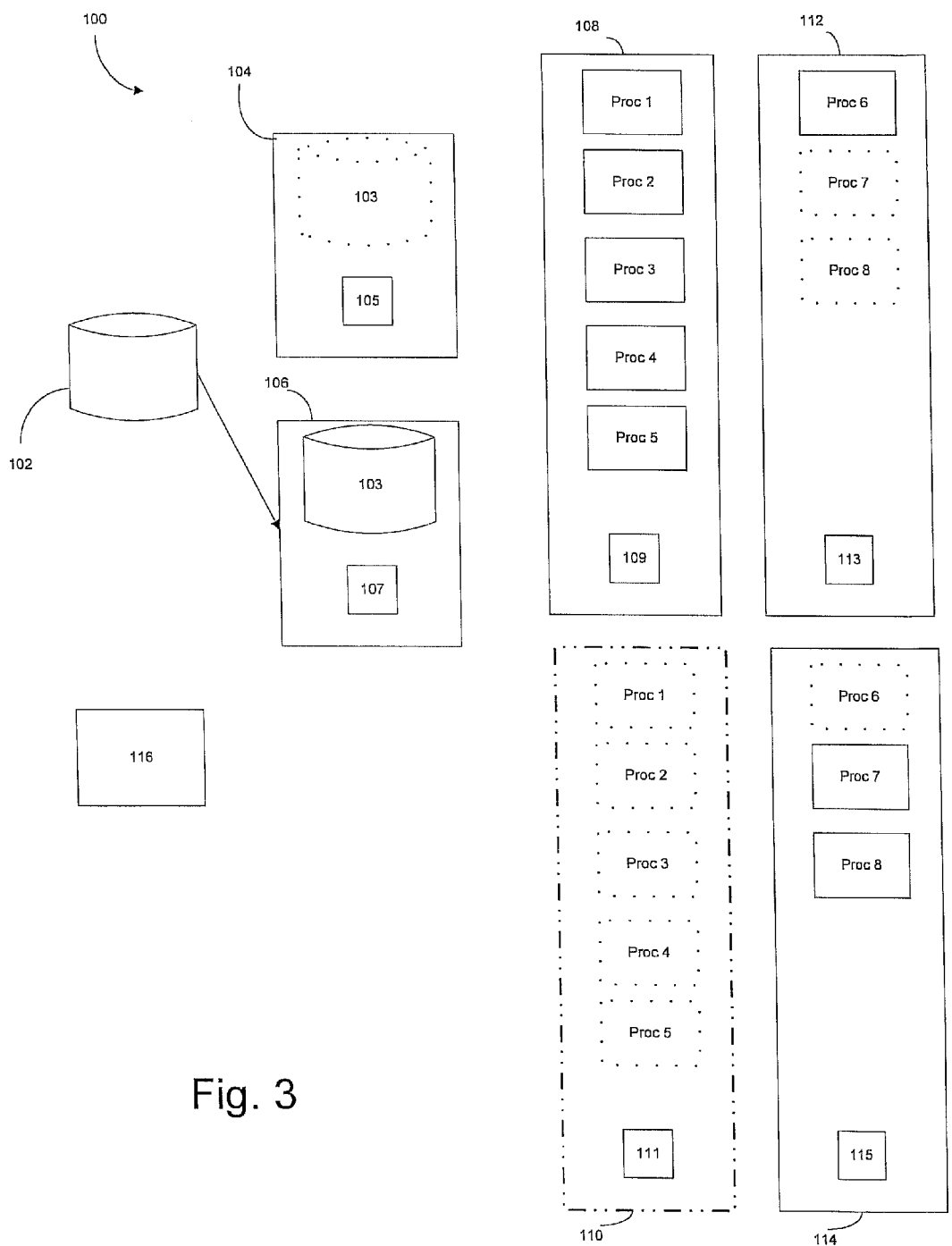
FIG. 3 is an exemplary view of a computing environment following multiple system events.

The results of these three scenarios may be seen in exemplary FIG. 3, as compared with the original exemplary environment shown in FIG. 1. As can be seen, the DBMS 103 is now running on server 106, and DBMS 103 on server 104 is shown as being offline. Also, server 110 is now shown as being offline, as indicated by the broken line surrounding server 110, and the processes previously running in server 110 are all shown as down, while the processes that were formerly being run on server 110 are now shown as running on server 108, for example shown by the solid lines surrounding process 4 and process 5 on server 108.

Figure 4:
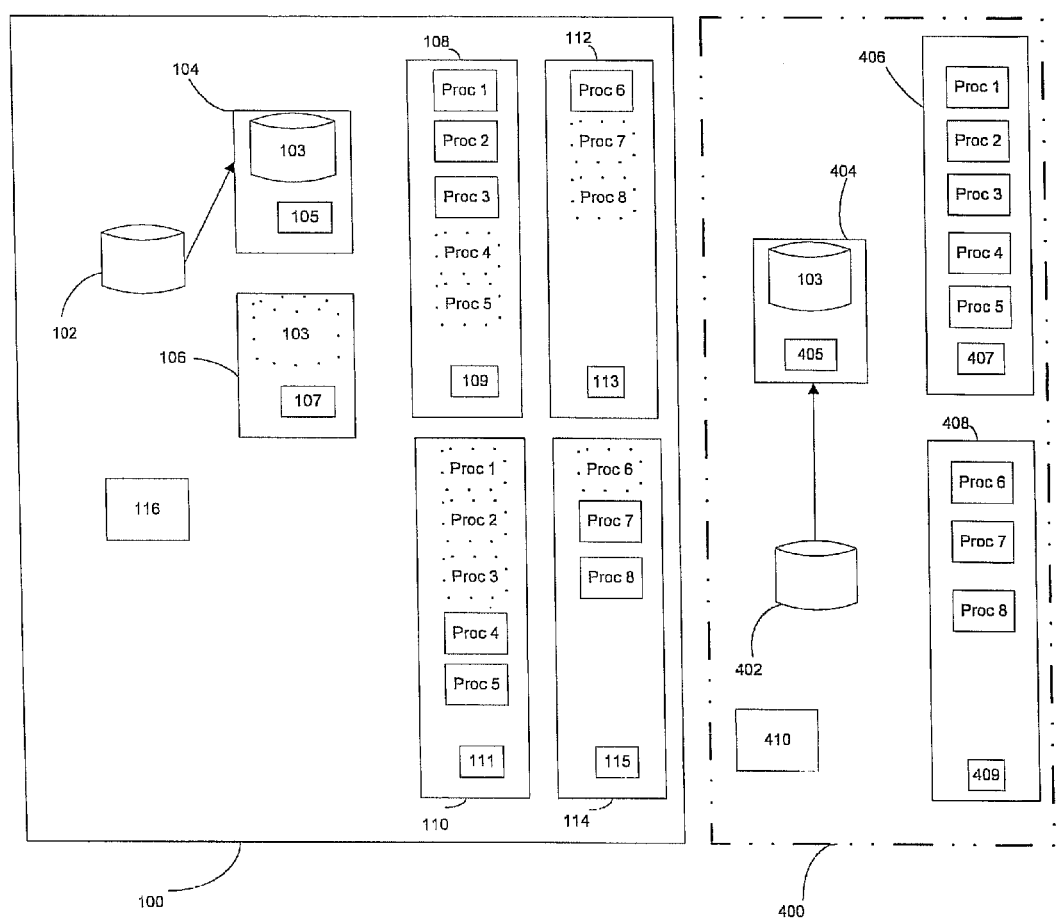
FIG. 4 is an exemplary diagram showing multiple computing environments.

In another exemplary embodiment and as seen in exemplary FIG. 4, a secondary computing environment may be associated with a primary computing environment. For example, a secondary environment 400 may be a disaster recovery environment that allows for the continuity of the processes in the event of any type of failure of environment 100. In this example, there may be data replication between storage area network 102 and storage area network 402. The data replication may take any of a variety of forms, for example replication through a storage area network or through database replication. Further, a user of environment 100 or environment 400 could switch to an alternative environment through the use of controls in appliance 116 and appliance 410, respectively. Additionally, appliance 116 and appliance 410 may also be able to manage data replication and switches between environments, for example through domain name server changes.

In the example shown in FIG. 4, it may also be shown that a secondary environment may have a different configuration than a primary environment. In this example, environment 400 includes storage area network 402, server 404, server 406, server 408 and appliance 410, as well as CM agents 405, 407 and 409. Also, DBMS 103 may be configured on server 404, similar to how DBMS may be configured on servers 104 and 106. Additionally, each environment may have its own server-to-process allocation table, similar to that depicted in Table 3, with respect to environment 100. Further, environment 400 may be such that any or all elements and processes may either be down or in a standby state until it is desired that any or all elements or processes become active. This may be seen in FIG. 4 through the broken line surrounding environment 400.

Figures 2, 5:
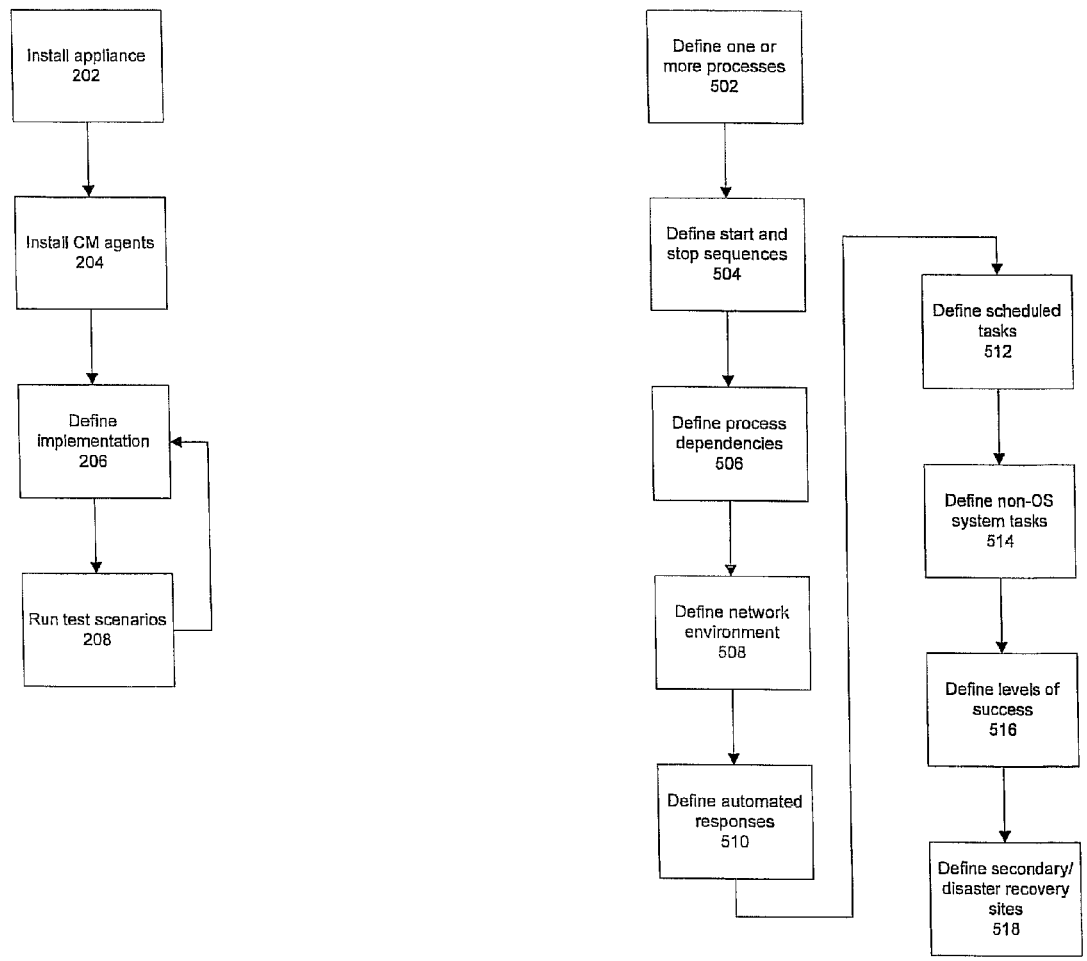
FIG. 2 is an exemplary flow chart showing steps for generating an appliance.
FIG. 5 is an exemplary flow chart showing steps for managing a computing environment.

In another exemplary embodiment, and as shown in exemplary FIG. 5 a method of defining a configuration of processes and/or procedures for monitoring, managing and/or controlling an application may be described. For each of these steps, any environment on which the processes may be hosted and run may be utilized. For example, as shown in step 502, one or more processes and the methods by which to create, status, start, stop and/or manage may be defined. Next, in 504, a sequence in which to start and stop processes in a controlled manner may be defined. Then, in 506, process dependencies may be defined, and which may allow for the determination of an appropriate action or action to take place. In some exemplary embodiments, the appropriate action or actions to take place may be dictated by any of a variety of factors, such as system events, user requests, status of the environment and the like. Next, in 508, a network environment may be defined. The network environment may include where the processes will run, for example servers, operating systems, databases, other networked components and the like.

Still referring to FIG. 5, and now to step 510, one or more levels of automated response and/or notification for each application component may be defined. Then, in 512, one or more scheduled tasks to perform across various components may be defined and, in step 514, support for SQL and any of a variety of other non-operating system tasks may be defined. Following those steps, in 516, criteria and methodology or methods for determining a level of success for the outcome of a given action may be defined, along with possible directions as to how to proceed based upon the outcome or level of success of the given action. Then, in 518, configurations for any number of sites that may support disaster recovery and geographic load balancing may be defined.

In a further exemplary embodiment of that discussed with respect to FIG. 5, the methodology described may be able to support any available or desired hardware platforms, operating systems, database management system, other networked devices and the like. Additionally, the methodology may be able to provide such support transparently or without the need to rely on outside components or factors.

In a still further exemplary embodiment of that shown in FIG. 5, a method, system and apparatus for taking a consolidated configuration and determining the appropriate action or actions based upon systemic events or user requests may be described. This may include action taken based upon events from monitoring of the various components of the environment and/or user requests transmitted via a command line or any other type of methodology that may be available through a user interface. Exemplary actions include, but are not limited to, starting individual processes, such as those for a specific server or an entire application; stopping individual processes, processes for a specific server or an entire application; stopping any or all dependent processes when a process stops, ceases function or crashes and restarting the stopped process as well as any or all dependent processes; removing a machine for configuration and moving processes to one or more alternate servers; adding one or more servers and redistributing processes to utilize the one or more added servers; managing one or more processes between devices so as to facilitate high availability; determining the status of any process or component in an environment; and implementing failover to and failback from separate sites, for example geographically separate sites, for disaster or any other type of recovery. The appliance may be able to, for example, assist in lessening the time needed to perform tasks and run tests, allowing for greater ease in implementing scenarios, such as disaster recovery.

In yet another exemplary embodiment, a method and system for saving configurations, as described previously, may further have templates that can expedite further implementations of an application. The templates can include any of a variety of information, such as process definitions, process dependencies, process sequences and process steps that may be consistent between implementations. Other information which may or may not be included in the templates includes implementation specific data, for example specific servers. Also, templates may be generated for any desired application. For example, templates may be generated for custom applications that allow for the efficient support of different instantiations, such as testing, developing and demonstrating. Further, the use of templates can streamline an implementation of an application manager, which can allow for leading practices for commercially available packaged applications, such as PeopleSoft, Oracle and Siebel. Also, any implementation that has been defined in the appliance may also be used as a template to generate or create additional implementations.

Still other exemplary embodiments include a method and system for installation and configuration of common packed applications. This method and system may allow for the streamlining for the implementation of new environments, for example new environments based on a consistent best practice framework. The method and system can include any of a variety of components, for example an underlying database, backups, restores, monitoring and routine administrative tasks including, but not limited to, job scheduling, archiving of data and database reorganizations. Implementations of this exemplary method and system may allow for the reduction of reliance on technical staff, the leveraging of best practices driven by packaged application experts, the ensuring of consistency and repeatability and the simplification of supportability. Further, the exemplary method and system can allow for out-of-the-box support by the application manager, as discussed in other exemplary embodiments.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of managing computer processes, comprising:
    defining, by a computer, a plurality of computer processes on a plurality of computers communicating on a network;
    defining an appliance that allocates and controls locations of the plurality of computer processes on the plurality of computers communicating on the network;
    distributing processes on the plurality of computers communicating on the network;
    determining success rates of the processes on the plurality of computer communicating on the network; and
    establishing a hierarchy of directions based upon success rates of the processes given a system event, at least one of the directions distributing a process away from a crashed server or a crashed computer process.

2. The method of claim 1, wherein the system event is at least one of a process crash and user request.

3. The method of claim 1, further comprising configuring a second network for at least one of disaster recovery and geographic load balancing.

4. The method of claim 1, further comprising monitoring system events across the network.

5. The method of claim 1 further comprising automating movement of processes among the plurality of computers communicating on the network.

6. The method of claim 1, further comprising automating movement of processes from the plurality of computer communicating on the network to a plurality of computers communicating on a second network.

7. A system that manages computer processes, comprising:
    a plurality of computer processes running on a plurality computers communicating on a first network;
    a set of rules that determine initial locations for the plurality of computer processes on the plurality of computers; and
    an appliance that monitors the plurality of computer processes and dynamically allocates relocation of the processes on the plurality of computers on the at least first network based on at least one of a system event, a user request and a probability of successful execution of the processes,
    the system adapted to establish a hierarchy of directions based upon success rates of the plurality of computer processes given a system event, at least one of the directions distributing a process away from a crashed server or a crashed computer process.

8. The system of claim 7, further comprising at least a second network communicatively coupled with the first network; the at least second network having a plurality of computers communicating thereon and capable of running the plurality of computer processes.

9. The system of claim 8, wherein the appliance allocates relocation of the processes on the plurality of computers communicating on the first network to the plurality of computers communicating on the at least second network.

* * * * *